United States Patent [19]

Bryson, III et al.

[11] Patent Number: 5,756,887
[45] Date of Patent: May 26, 1998

[54] MECHANISM FOR CHANGING A PROBE BALANCE BEAM IN A SCANNING PROBE MICROSCOPE

[75] Inventors: Charles E. Bryson, III, Santa Clara, Calif.; Joseph E. Griffith, Berkeley Heights; Gabriel L. Miller, Westfield, both of N.J.

[73] Assignee: Lucent Technologies Inc., Murray Hill, N.J.

[21] Appl. No.: 807,310

[22] Filed: Feb. 27, 1997

[51] Int. Cl.[6] ................................................ G01B 11/24
[52] U.S. Cl. ............................................................ 73/105
[58] Field of Search ............................. 73/105, 866.5; 250/306, 310, 311; 33/572

[56] References Cited

U.S. PATENT DOCUMENTS 5,146,690  9/1992  Breitmeier ........................... 73/105
5,481,908  1/1996  Gamble ............................... 73/105

*Primary Examiner*—Robert Raevis

[57] ABSTRACT

A scanning probe microscope equipped with a mechanism for exchanging a probe balance beam from the scan head, wherein the probe balance beam is of the type which is magnetically constrained on the scan head. A magnet having a magnetic field strength greater than that of the scan head magnet is utilized to overcome the attractive force exerted on the balance beam by the scan head magnet and transfer the balance beam from the scan head to a plate in a holding station on the sample table of the microscope. Completely automatic operation is achieved without operator handling of the balance beam.

6 Claims, 6 Drawing Sheets

MECHANISM FOR CHANGING A PROBE BALANCE BEAM IN A SCANNING PROBE MICROSCOPE

BACKGROUND OF THE INVENTION

This invention relates to the field of scanning probe microscopes and, more particularly, to a mechanism for effecting the replacement of a probe balance beam on the scan head of a scanning probe microscope.

Scanning probe microscopes utilize a very fine probe having a tip which is maintained either just touching or very close to the surface of a sample. The probe is mounted to a scan head and the sample is mounted to a table, with the scan head and table being arranged for three-dimensional relative movement therebetween. Over time, the probe becomes worn or damaged and therefore must be replaced. Also, it is sometimes desired to change the size or type of probe. Until now, such replacement has been effected in a manual manner. Since the probe tips are extremely fragile, they are easily damaged when handled. The probes are expensive and many are lost as operators attempt to insert them into their microscopes. This manual replacement is also a time consuming process that distracts the operator from other activities. Accordingly, it would be desirable to be able to perform this probe replacement operation in an automated manner.

A balance beam including a probe for a scanning probe microscope is disclosed in U.S. Pat. No. 5,307,693, the contents of which are hereby incorporated by reference herein. This probe balance beam includes a pair of ball bearings which are held on the scan head by an embedded magnet. It would be desirable to provide an automated probe replacement mechanism, as described above, for such a magnetically constrained probe balance beam.

SUMMARY OF THE INVENTION

The present invention takes advantage of the fact that a magnetically constrained probe balance beam can be removed from the scan head by exposing it to a magnet which is stronger than the scan head magnet. The inventive mechanism is mounted to the table of the scanning probe microscope and includes a magnet having a magnetic field strength greater than that of the scan head magnet and a non-magnetic substantially planar plate parallel to the surface of the scan head and between the mechanism's magnet and the scan head surface. The plate is adapted to receive a probe balance beam thereon. The mechanism also includes an actuator controllable to move the magnet toward and away from the plate in a linear direction substantially orthogonal to the plate. Accordingly, when a probe balance beam is magnetically constrained on the scan head surface with the plate aligned with the scan head surface and the mechanism's magnet is moved toward and adjacent the plate, the magnetic attraction of the mechanism's magnet overcomes that of the scan head's magnet so that as the table and the scan head are subsequently separated in a direction orthogonal to the scan head surface, the constrained probe balance beam is transferred from the scan head surface to the plate. Conversely, when a probe balance beam is magnetically constrained on the plate by the mechanism's magnet being adjacent the plate with the plate aligned with the scan head surface, and the mechanism's magnet is subsequently moved away from the plate, the magnetic attraction of the scan head's magnet overcomes that of the mechanism's magnet so as to transfer the probe balance beam from the plate to the scan head surface.

In accordance with an aspect of this invention, the probe balance beam includes a ferromagnetic pivot element and the plate is formed with a concavity for receiving the pivot element.

In accordance with another aspect of this invention, springs are utilized for mounting the plate to the table.

In accordance with a further aspect of this invention, the table includes a loading station having a recess and a linearly movable second actuator extending into the recess. A cartridge for holding a probe balance beam is insertable into the recess. The cartridge includes a non-magnetic probe balance beam support member having a plate-like extension with a substantially planar probe balance beam receiving surface, the probe balance beam support member being adapted for receipt in the recess with the probe balance beam receiving surface parallel to the scan head surface. The cartridge further includes a magnet having a magnetic field strength greater than that of the scan head's magnet and a magnet support member holding the cartridge magnet adjacent the extension on the opposite side of the extension from the probe balance beam receiving surface. The magnet support member is resiliently mounted to the probe balance beam support member and arranged to be movable in a substantially linear direction substantially orthogonal to the probe balance beam receiving surface, the magnet support member having a beam adjacent the second actuator. Accordingly, the second actuator is effective to engage the magnet support member beam for moving the cartridge magnet toward and away from the support member probe balance beam receiving surface so that a probe balance beam can be transferred between the scan head and the cartridge. The cartridge is therefore utilized for loading/unloading probe balance beams into/from the scanning probe microscope.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
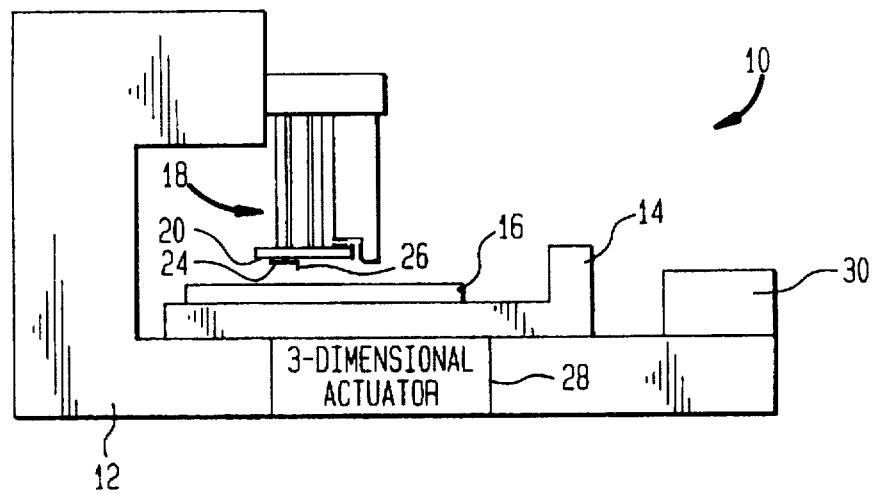
FIG. 1 is a schematic side view of a conventional scanning probe microscope in which the present invention finds utility.

Referring now to the drawings, FIG. 1 is a side view schematically illustrating a conventional scanning probe microscope, designated generally by the reference numeral 10. The scanning probe microscope 10 includes a base member 12 having mounted thereon a table 14 adapted to hold a sample 16 to be scanned. A scan head 18 is also mounted to the base member 12. The scan head 18 has a substantially planar surface 20 and a magnet 22 (FIG. 3) embedded therein adjacent the surface 20. The scan head 18 is adapted for use with a balance beam 24 having a tipped probe 26. As described in the aforereferenced U.S. Pat. No. 5,307,693, the balance beam 24 is adapted for constraint on the surface 20 by the magnet 22.

As is conventional, the table 14 and the scan head 18 are arranged for relative three-dimensional movement therebetween. Accordingly, a three-dimensional actuator 28 may be mounted to the base member 12 for moving the table 14 relative to the scan head 18. A position sensor 30 mounted to the base member 12 provides feedback as to the position of the table 14. Alternatively, some of the three-dimensional motion may be applied directly to the scan head 18 and, in addition, the scan head 18 may be provided with a piezoelectric transducer (not shown) for effecting fine movements of the probe 26. The foregoing is conventional and does not form a part of the present invention.

Figure 2:
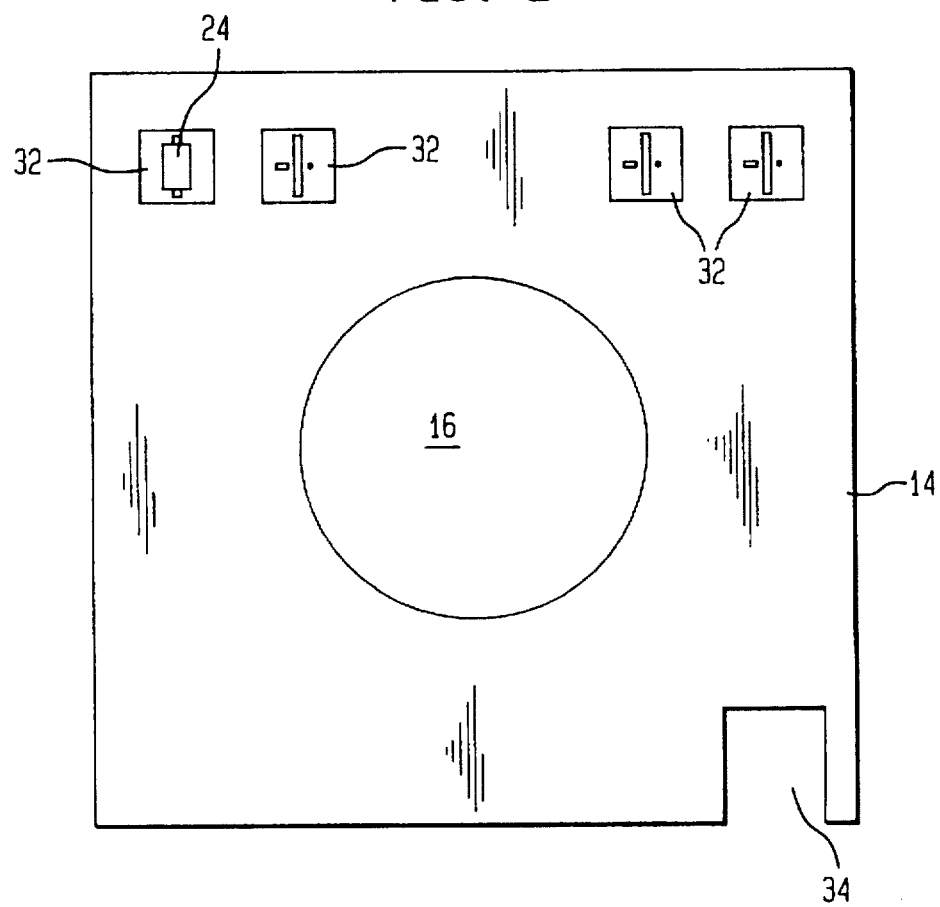
FIG. 2 is a schematic plan view of the table of the scanning probe microscope of FIG. 1 showing mechanisms according to this invention installed therein.

FIG. 2 shows the table 14 modified according to this invention so as to have off to the side of the sample 16 a plurality of balance beam holding stations 32 each with a mechanism according to this invention. As illustrated, only the leftmost holding station 32 has a balance beam 24 held thereon. In addition, the table 14 is fitted with a cartridge loading station 34 (shown as an empty recess in FIG. 2).

As shown in FIGS. 3–6, the transfer mechanism mounted to the table 14 in the balance beam holding station 32 includes a non-magnetic substantially planar plate 36 parallel to the surface 20 of the scan head 18. The plate 36 is mounted by means of springs 38, the purpose of which will be explained hereinafter. As described in the referenced patent, the balance beam 24 includes a ferromagnetic pivot element, illustratively ball bearing 40, and the plate 36 is formed with a concavity 42 for receiving the ball bearing 40. The plate 36 is further formed with an aperture 44 for receiving the probe 26. The inventive mechanism further includes a magnet 46 on the opposite side of the plate 36 from the scan head 18. The magnet 46 has a magnetic field strength greater than that of the magnet 22, for reasons which will become clear from the following discussion. The magnet 46 is mounted to an actuator 48 which is controllable to move the magnet 46 toward and away from the plate 36 in a linear direction substantially orthogonal to the plate 36.

Figure 3:
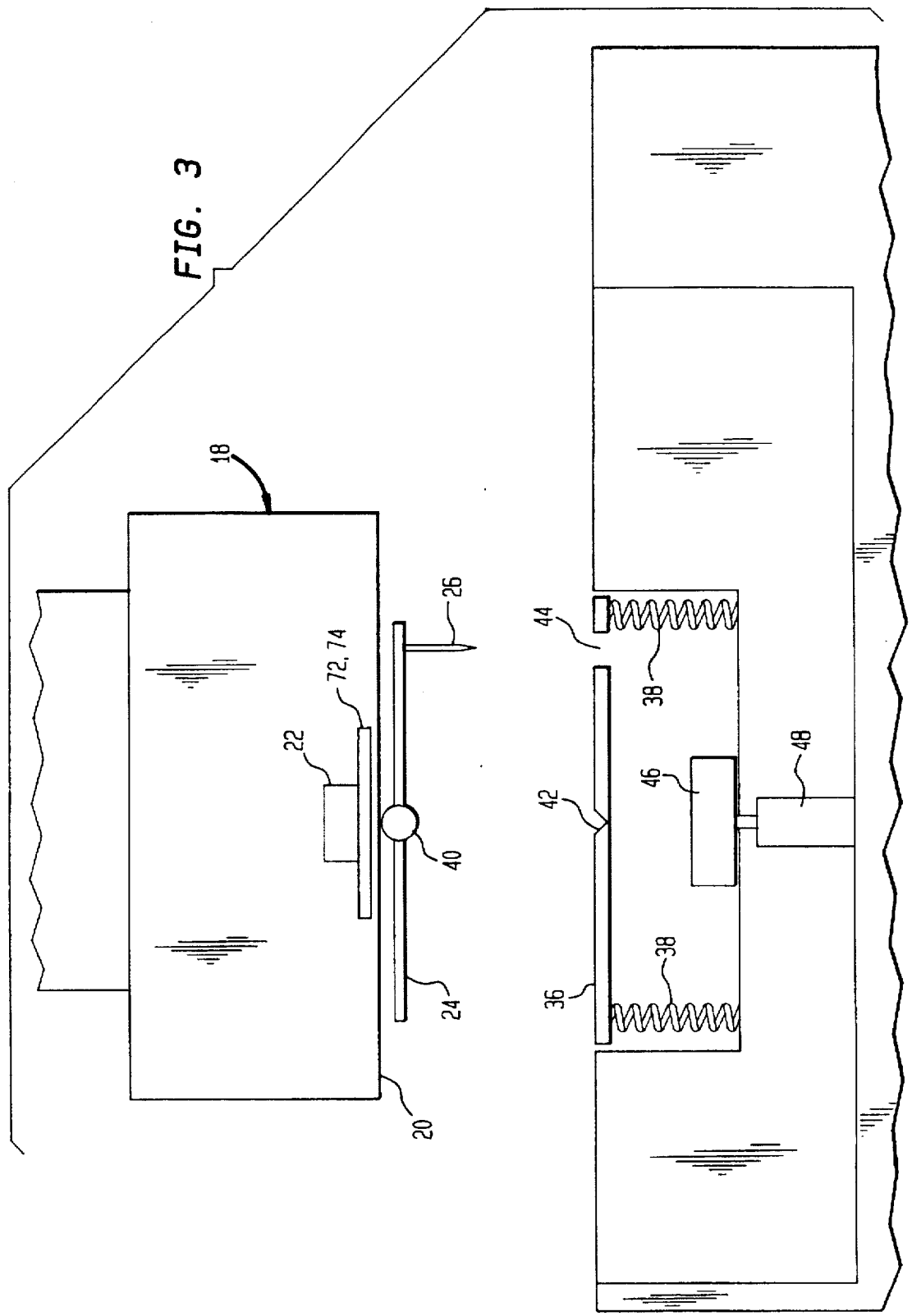
FIGS. 3–6 are schematic side views showing the transfer mechanism according to the present invention and illustrating the sequence of steps in the transfer of a probe balance beam.
Figure 4:
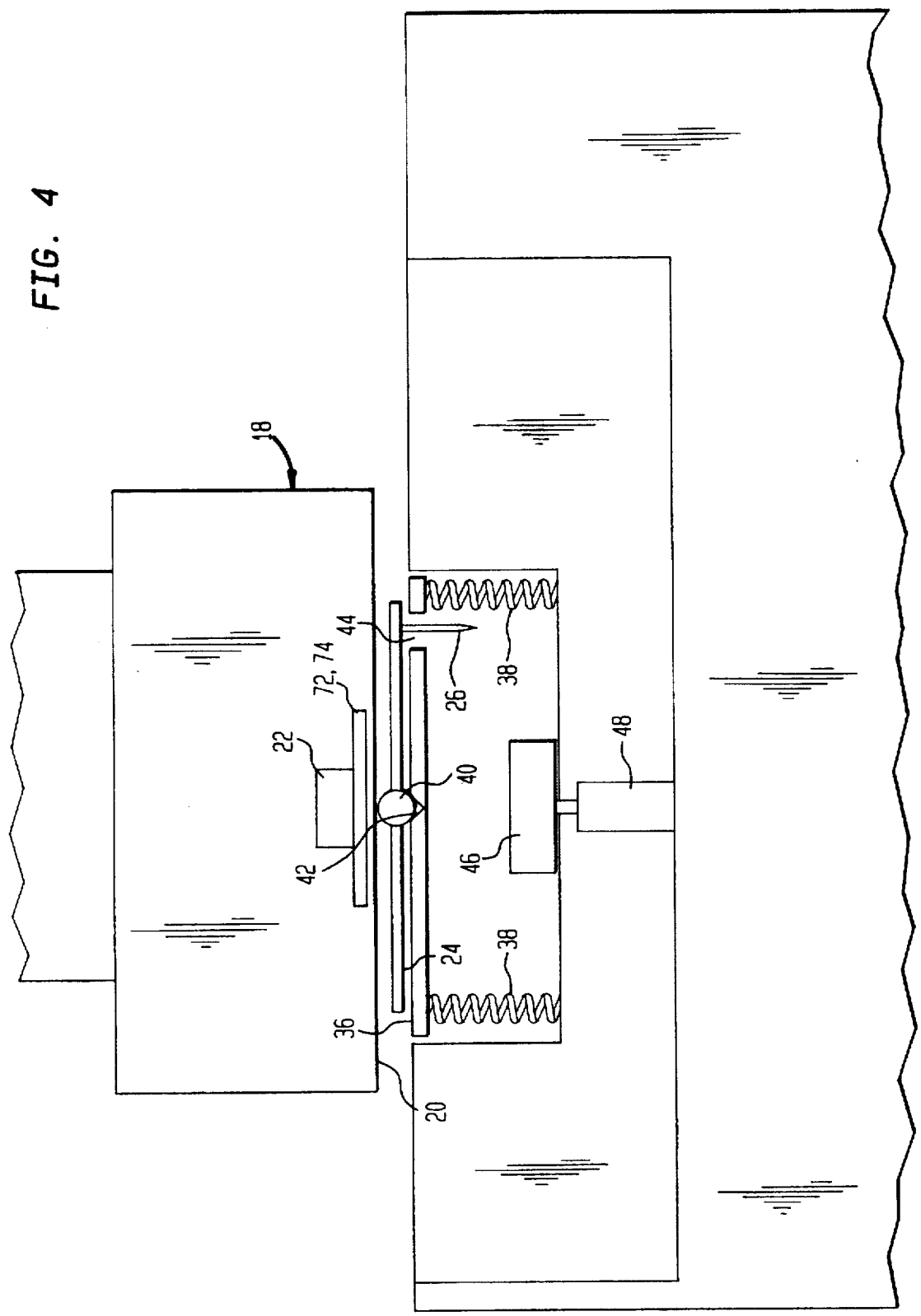
Figure 5:
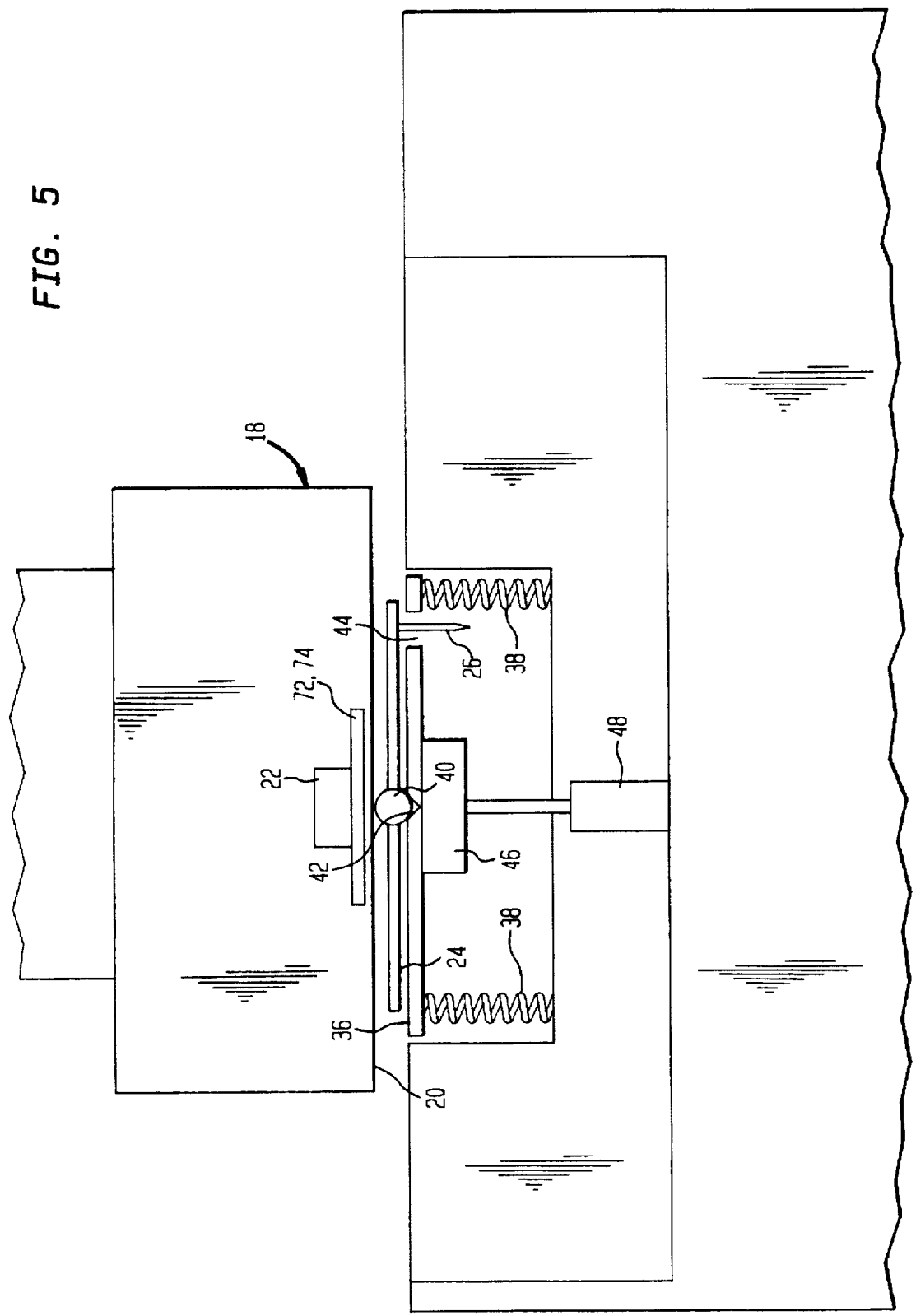
Figure 6:
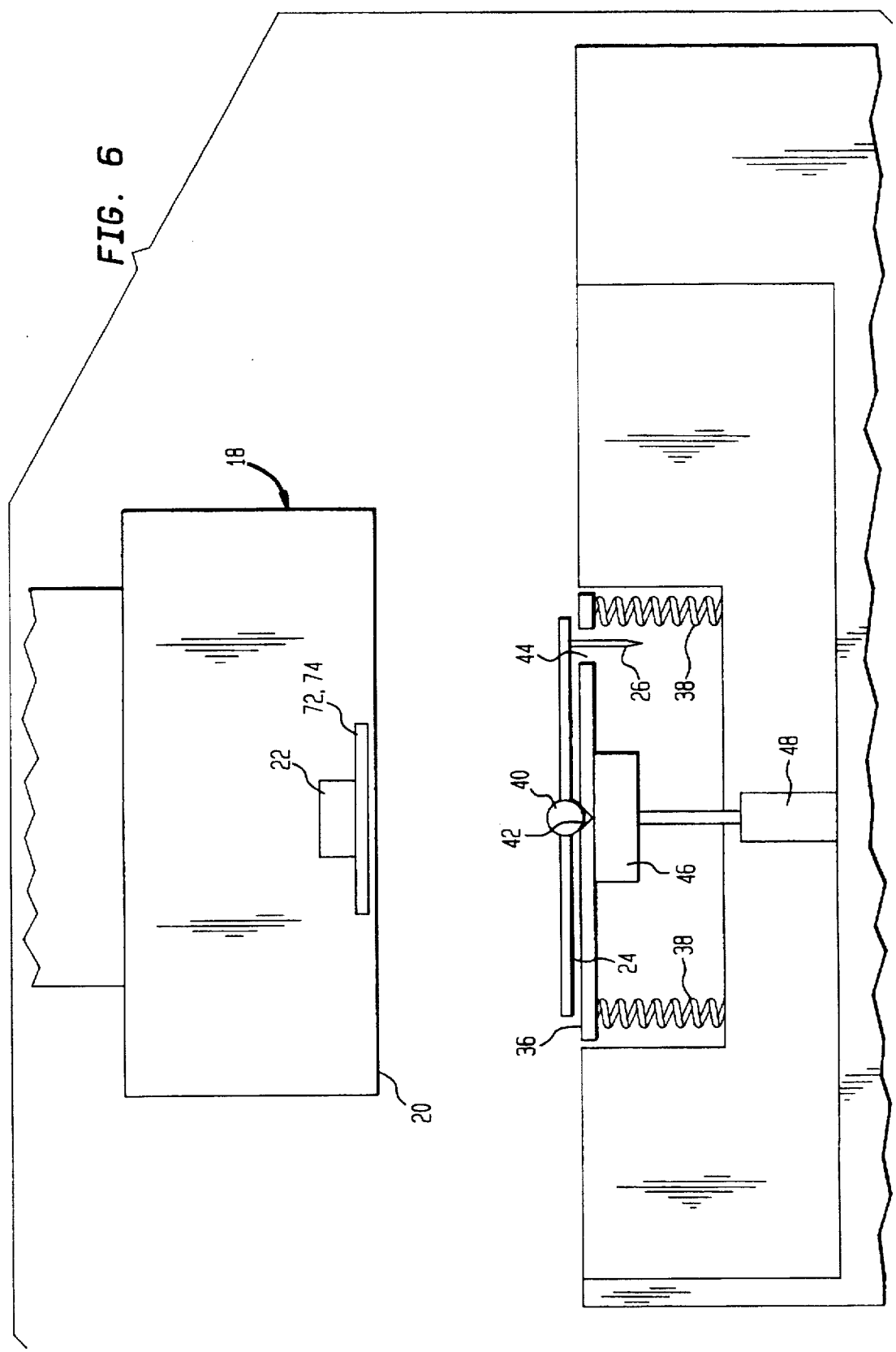

FIGS. 3–6 illustrate the transfer of a balance beam 24 between the scan head 18 and a holding station 32. As shown in FIG. 3, the balance beam 24 is held on the scan head 18 by the magnet 22. To effect a transfer, the holding station 32 is first positioned below the scan head 18. As shown in FIG. 4, the table 14 then moves the holding station 32 toward the scan head 18 so that the ball bearing 40 is received in the cavity 42 and the probe 26 is received in the aperture 44. The springs 38 limit the force which can be impressed on the fragile scan head 18. As shown in FIG. 5, the actuator 48 is then controlled to move the magnet 46 toward and adjacent the plate 36. As previously discussed, the magnetic field strength of the magnet 46 is greater than that of the magnet 22 so that the magnet 46 exerts a greater attractive force on the balance beam 24 than does the magnet 22. As shown in FIG. 6, when the table 14 is subsequently moved away from the scan head 18, the balance beam 24 remains magnetically constrained on the plate 36 due to the greater magnetic attraction of the magnet 46. When it is desired to transfer a balance beam from a holding station to the scan head, the above described sequence is reversed.

In one embodiment of the present invention, the process described above is executed entirely automatically, without operator intervention. A computer controls the position of the table 14, as well as the position of the retractable magnet 46. The computer also contains software to keep track of the status of each of the holding stations 32, i.e., whether it contains a balance beam and the status of the probe tip on the beam. As shown in FIG. 2, the table 14 can contain several holding stations 32. Having multiple holding stations allows the scanning probe microscope to use several types of probe tips during a scanning session. Alternatively, the holding stations can be loaded with identical probes so they can be used sequentially, each probe being replaced when it is worn out.

Figure 7:
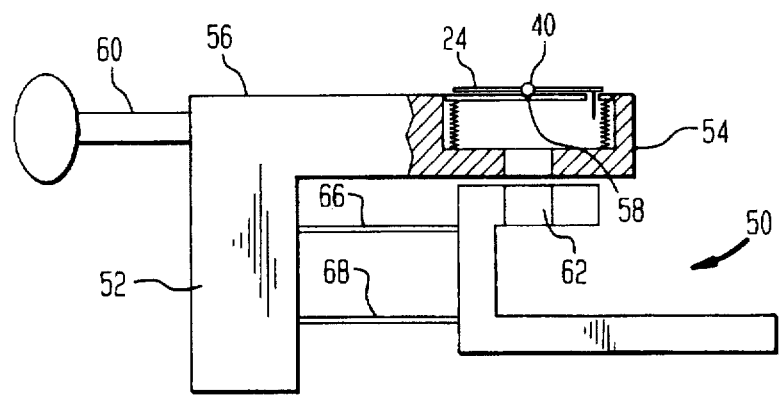
FIG. 7 is a schematic view of a probe balance beam loading cartridge according to the present invention.
Figure 8:
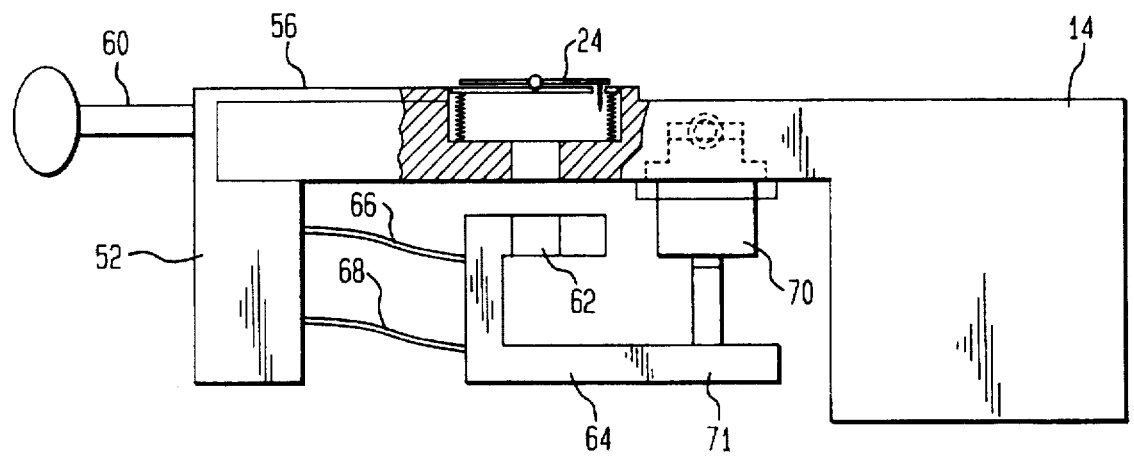
FIG. 8 schematically shows the cartridge of FIG. 7 installed in the table of the scanning probe microscope.

In order to load probe balance beams into, and unload probe balance beams from, the scanning probe microscope 10, there is provided a loading station 34 adapted to receive a cartridge 50, shown in FIG. 7. The cartridge 50 may be preloaded with a balance beam 24 at an assembly area where handling of the balance beam can be done in a careful and controlled manner, so that the balance beam is not damaged. The cartridge 50 includes a non-magnetic balance beam support member 52 having a plate-like extension 54 with a substantially planar surface 56 for receiving a balance beam 24 thereon. The surface 56 may be formed with a concavity 58 for receiving the ball bearing 40 of the balance beam 24. A handle 60 is preferably provided so that an operator can insert the cartridge 50 into the recess of the loading station 34. The recess of the loading station 34 and the support member 52 are formed with complementary features so that the support member 52 is easily and positively received in the recess with its surface 56 parallel to the surface 20 of the scan head 18. The cartridge 50 further includes a magnet 62 held by a magnet support member 64. Like the magnet 46, the magnetic field strength of the magnet 62 is greater than that of the magnet 22. The magnet support member 64 holds the magnet 62 adjacent the extension 54 and on the opposite side of the extension 54 from its surface 56. The magnet support member 64 is resiliently mounted to the support member 52 by a pair of leaf springs 66, 68, which are parallel to the surface 56 and are in spaced overlying relation to each other. Such resilient mounting allows the magnet support member 64 to be moved relative to the support member 52 in a substantially linear direction orthogonal to the surface 56. As part of the cartridge loading station 34, the table 14 has a linearly movable actuator 70 extending into the recess. The magnet support member 64 has a beam 71 which is adjacent the actuator 70 when the cartridge 50 is installed in the loading station 34.

As shown in FIG. 7, in the stable, at rest, condition of the cartridge 50, the magnet is closely adjacent the extension 54 to magnetically constrain the balance beam 24 on the surface 56. When the cartridge 50 is installed in the loading station 34 and the actuator 70 is controlled to move the magnet support member 64 away from the extension 54, the magnetic attraction of the magnet 62 on the balance beam 24 is decreased. Accordingly, a balance beam 24 may be transferred from the cartridge 52 by positioning the loading station 34 underneath the scan head 18, decreasing the distance between the scan head 18 and the cartridge 50, and controlling the actuator 70 to move the magnet 62 away from the balance beam 24 so that the magnetic attraction of the magnet 22 and the scan head 18 overcomes the magnetic attraction of the magnet 62. In reverse, a balance beam 24 may be transferred from the scan head 18 to a cartridge 50 for subsequent removal from the scanning probe microscope 10. The cartridge 50 may be utilized for transferring a balance beam 24 to a holding station 32, by first making a transfer from the cartridge 50 to the scan head 18 and then making a transfer from the scan head 18 to a holding station 32.

Figure 9:
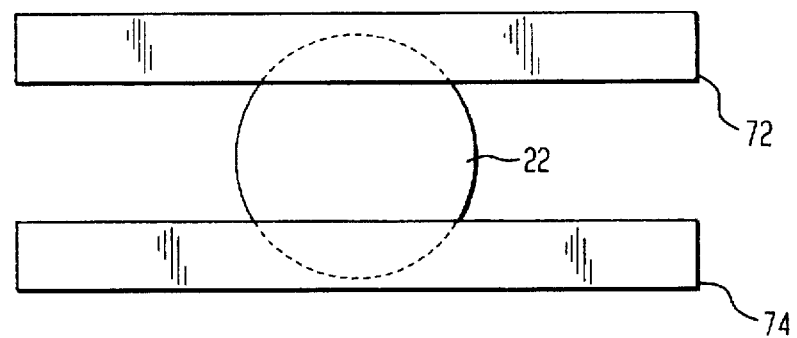
FIG. 9 illustrates improved scan head magnet structure.

FIG. 9 illustrates improved structure for the scan head magnet 22. Although the magnet 22 is shown as having a circular pole face, it is not intended that this particular shape be construed as limiting. A pair of rails 72, 74 are provided, each of the rails being made of ferromagnetic material, such as soft iron. The rails 72, 74 are embedded in the scan head 18 in contact with the magnet 22 and extend substantially parallel to the surface 20. They function to spread out the magnetic field provided by the magnet 22 and make it more uniform over a larger area beyond the extent of the pole face of the magnet 22, thereby allowing the beam 24 to balance more reliably when it is placed on the scan head 18. It has been found that a spacing of the rails 72, 74 of about the same or greater than the distance between the pivot balls 40 of the beam 24 is effective.

Accordingly, there has been disclosed a mechanism for effecting the replacement of a probe balance beam on the scan head of a scanning probe microscope. While a preferred embodiment of the present invention has been disclosed herein, it will be apparent to one of ordinary skill in the art that various modifications and adaptations to the disclosed embodiment are possible and it is intended that this invention be limited only by the scope of the appended claims.

What is claimed is:

1. A scanning probe microscope comprising:
   a table for holding a sample to be scanned;
   a scan head having a substantially planar surface and a first magnet adjacent said surface, the scan head adapted for use with a balance beam including a tipped probe, the balance beam adapted for constraint on said surface by the first magnet, wherein the table and the scan head are adapted for relative three-dimensional movement therebetween; and
   a mechanism mounted to the table for effecting removal of a balance beam from the scan head and placement of a balance beam on the scan head, the mechanism including:
     a second magnet having a magnetic field strength greater than that of the first magnet;
     a non-magnetic substantially planar plate parallel to said scan head surface and between said second magnet and said scan head surface, the plate adapted to receive a balance beam therein; and
     an actuator controllable to move the second magnet toward and away from said plate in a linear direction substantially orthogonal to said plate; whereby:
       (1) when a balance beam is magnetically constrained on said scan head surface with said plate aligned with said scan head surface and said actuator is controlled to move said second magnet toward and adjacent said plate, the magnetic attraction of said second magnet overcomes that of said first magnet so that as said table and said scan head are subsequently separated in a direction orthogonal to said scan head surface the constrained balance beam is transferred from said scan head surface to said plate; and
       (2) when a balance beam is magnetically constrained on said plate by said second magnet being adjacent said plate with said plate aligned with said scan head surface and said actuator is controlled to subsequently move said second magnet away from said plate, the magnetic attraction of said first magnet overcomes that of said second magnet so as to transfer the balance beam from said plate to said scan head surface.

2. The scanning probe microscope according to claim 1 wherein the balance beam includes a ferromagnetic pivot element and the plate is formed with a concavity for receiving said pivot element.

3. The scanning probe microscope according to claim 1 further including spring means for mounting said plate to said table.

4. The scanning probe microscope according to claim 1 wherein said first magnet is a permanent magnet having a planar pole face parallel to said scan head surface, and further including:
   at least one elongated rail of ferromagnetic material extending parallel to said scan head surface from a portion in close proximity to said pole face to beyond said pole face so as to provide a substantially uniform magnetic field beyond the extent of said pole face.

5. The scanning probe microscope according to claim 1 wherein said table includes a loading station having a recess and a linearly movable second actuator extending into said recess, and further including a cartridge for holding a balance beam, said cartridge being insertable into said recess and including:
   a non-magnetic balance beam support member having a plate-like extension with a substantially planar balance beam receiving surface, said balance beam support member adapted for receipt in said recess with said balance beam receiving surface parallel to said scan head surface;
   a cartridge magnet having a magnetic field strength greater than that of said first magnet; and
   a magnet support member holding said cartridge magnet adjacent said extension and on the opposite side of said extension from said balance beam receiving surface, said magnet support member being resiliently mounted to said balance beam support member and arranged to be movable in a substantially linear direction orthogonal to said balance beam receiving surface, said magnet support member having a beam adjacent said second actuator;
   wherein said second actuator is effective to engage said magnet support member beam for moving said cartridge magnet toward and away from said support member balance beam receiving surface so that a balance beam can be transferred between said scan head and said cartridge.

6. The scanning probe microscope according to claim 5 wherein said cartridge includes a pair of leaf springs for resiliently mounting said magnet support member to said balance beam support member, said pair of leaf springs being parallel to said balance beam receiving surface and in spaced overlying relation to each other, whereby said magnet support member partakes of substantially linear movement under the influence of said second actuator.

* * * * *